(12) United States Patent
Zhang (10) Patent No.: US 9,218,103 B2
(45) Date of Patent: Dec. 22, 2015

(54) 3D INTERFACE IMPLEMENTATION METHOD AND SYSTEM BASED ON THE ANDROID SYSTEM

(71) Applicant: Shenzhen Coocaa Network Technology Co. Ltd., Shenzhen (CN)

(72) Inventor: Kevin Zhang, Shenzhen (CN)

(73) Assignee: Shenzhen Coocaa Network Technology Co. Ltd., Shenzhen (CN)

( * ) Notice: Subject to any disclaimer, the term of this patent is extended or adjusted under 35 U.S.C. 154(b) by 222 days.

(21) Appl. No.: 13/816,873

(22) PCT Filed: Sep. 27, 2012

(86) PCT No.: PCT/CN2012/082110
§ 371 (c)(1),
(2) Date: Feb. 13, 2013

(87) PCT Pub. No.: WO2014/043935
PCT Pub. Date: Mar. 27, 2014

(65) Prior Publication Data
US 2014/0089861 A1 Mar. 27, 2014

(30) Foreign Application Priority Data
Sep. 19, 2012 (CN) .......................... 2012 1 0347675

(51) Int. Cl.
*G06F 3/048* (2013.01)
*G06F 3/0481* (2013.01)
*G06F 9/44* (2006.01)

(52) U.S. Cl.
CPC .......... *G06F 3/04815* (2013.01); *G06F 9/4443* (2013.01); *G06F 2203/04802* (2013.01)

(58) Field of Classification Search
CPC ..................... G06F 9/4443; G06F 2203/04802
USPC .................................... 715/643, 848; 349/419
See application file for complete search history.

(56) References Cited

U.S. PATENT DOCUMENTS 7,134,095 B1 * 11/2006 Smith ................. G06F 3/04812
715/848
8,537,157 B2 * 9/2013 Adimatyam ............ G06F 3/017
345/156

(Continued)

FOREIGN PATENT DOCUMENTS

| CN | 101984671 | 3/2011 |
|---|---|---|
| CN | 102404633 | 4/2012 |
| JP | 2008170309 | 7/2008 |

*Primary Examiner* — William Titcomb
(74) *Attorney, Agent, or Firm* — Sand & Sebolt (57) ABSTRACT

The present disclosure provides a method based on an android system for displaying a three-dimension interface, including: a three-dimension engine library transmitting a user operation command to an android system service layer; the android system service layer transmitting the user operation command to a java terminal; the java terminal generating a responding instruction according to the user operation command and sending the responding instruction to the android system service layer; the android system service layer sending the responding instruction to the three-dimension engine library; and the three-dimension engine library controlling a three-dimension model document to load a three-dimension model corresponding to the responding instruction and redrawing the three-dimension interface accordingly. In the present disclosure, with the android system service layer, a decline of processing ability when the system resources are overloaded in an instant can be avoided.

20 Claims, 5 Drawing Sheets

(56) References Cited

U.S. PATENT DOCUMENTS

| | | | |
|---|---|---|---|
| 8,860,716 B2 * | 10/2014 | Kim et al. | 345/419 |
| 2007/0169066 A1 | 7/2007 | Nielsen | |
| 2012/0023496 A1 * | 1/2012 | Kwak et al. | 718/1 |
| 2012/0092335 A1 * | 4/2012 | Kim et al. | 345/419 |
| 2012/0192121 A1 * | 7/2012 | Bonnat | 715/863 |

* cited by examiner

3D INTERFACE IMPLEMENTATION METHOD AND SYSTEM BASED ON THE ANDROID SYSTEM

BACKGROUND

1. Technical Field

The disclosure generally relates to television technologies, and particularly, to a method and system for displaying a three-dimension interface based on an ANDROID® system (ANDROID is a registered trademark of Google Inc.)

2. Description of Related Art

Three-dimension interface has become a growing trend in the television user interface (UI) art, There are various types of three-dimension interface technologies in the market, such as an image switching type, a simulating model type, a real three-dimension model type, and etc. By using a three-dimension modeling mechanism, the real three-dimension model type of technology provides an UI with UI elements thereof having good stereoscopic effects, an intelligent and easy operation, and an excellent user experience. Thus, the real three-dimension model type of technology is popular among users. However, a traditional real three-dimension model type of technology is based on the embedded Linux system and is executed by C language and C++ language. Therefore, the real three-dimension model type of the technology generates a large amount of three-dimension model data and has a high requirement for the operation system. Most of present television systems are difficult to process model data of high accuracy, which causes low responses to the operations and affects the modeling of the three-dimension interface.

SUMMARY

An object of the invention is to provide a method and system based on an ANDROID® (hereinafter ANDROID for short) system for displaying a three-dimension interface which can sensitively respond to operation.

The present disclosure provides a method based on an ANDROID system for displaying a three-dimension interface, including:

a three-dimension engine library transmitting a user operation command to an ANDROID system service layer;

the ANDROID system service layer transmitting the user operation command to a JAVA® terminal (JAVA is a registered trademark of Oracle Corporation);

the JAVA terminal (hereinafter JAVA for short) generating a responding instruction according to the user operation command and sending the responding instruction to the ANDROID system service layer;

the ANDROID system service layer sending the responding instruction to the three-dimension engine library; and the three-dimension engine library controlling a three-dimension model document to load a three-dimension model corresponding to the responding instruction and redrawing the three-dimension interface accordingly.

Preferably, the method based on an ANDROID system for displaying a three-dimension interface further includes following steps before the step of transmitting a user operation command to an ANDROID system services layer:

the JAVA terminal transmitting a three-dimension modeling instruction to the ANDROID system service layer;

the ANDROID system service layer transmitting the three-dimension modeling instruction to the three-dimension engine library; and the three-dimension engine library controlling the three-dimension model document to load the three-dimension model corresponding to the three-dimension modeling instruction and building the three-dimension interface.

Preferably, the method based on an ANDROID system for displaying a three-dimension interface further includes following steps after the step of the three-dimension engine library controlling the three-dimension model document to load the three-dimension models corresponding to the three-dimension modeling instructions and building the three-dimension interface:

the JAVA terminal reading interface elements stored in a database of the ANDROID system;

the JAVA terminal transmitting the interface elements to the ANDROID system service layer;

the ANDROID system service layer transmitting the interface elements to the three-dimension engine library; and the three-dimension engine library controlling the three-dimension model document to load the interface elements, and drawing the interface elements on the three-dimension interface.

Preferably, the method based on an ANDROID system for displaying a three-dimension interface further includes:

the three-dimension engine library feeding back three-dimension interface status information to the ANDROID system service layer;

the ANDROID system service layer feeding back the three-dimension interface status information to the JAVA terminal; and the JAVA terminal generating a JAVA interface response window according to the three-dimension interface status information and drawing the JAVA interface response window in front of the three-dimension interface.

Preferably, the method based on an ANDROID system for displaying a three-dimension interface further includes:

the JAVA terminal receiving a displaying instruction transmitted from the ANDROID system; and the JAVA terminal generating the JAVA interface response window according to the displaying instruction and drawing the JAVA interface response window in front of the three-dimension interface.

The present disclosure further provides a system based on an ANDROID system for displaying a three-dimension interface, the system includes a three-dimension model document, a three-dimension engine library, an ANDROID system service layer, and a JAVA terminal;

the three-dimension engine library is configured for transmitting an user operation command to the ANDROID system service layer, controlling the three-dimension model document to load a three-dimension model corresponding to a responding instruction, and redrawing the three-dimension interface;

the three-dimension model document is configured for loading the three-dimension model corresponding to the responding instruction when being controlled by the three-dimension engine library; and the ANDROID system service layer is configured for transmitting the user operation command to the JAVA terminal and transmitting the responding instruction to the three-dimension engine library; and the JAVA terminal is configured for generating the responding instruction according to the user operation command and transmitting the responding instruction to the ANDROID system service layer.

Preferably, the JAVA terminal is further used to transmit a three-dimension modeling instruction to the ANDROID system service layer;

the ANDROID system service layer is further used to transmit the three-dimension modeling instruction to the three-dimension engine library;

the three-dimension engine library is further used to control the three-dimension model document to load the three-dimension model corresponding to the three-dimension modeling instruction and build the three-dimension interface; and the three-dimension model document is further controlled by the three-dimension engine library to load the three-dimension model corresponding to the three-dimension modeling instruction.

Preferably, the JAVA terminal is further used to read interface elements stored in the ANDROID system data base and send the interface elements to the ANDROID system service layer;

the ANDROID system service layer is further used to transmit the interface elements to the three-dimension engine library;

the three-dimension engine library is further used to control the three-dimension model document to load the interface elements and draw the interface elements on the three-dimension interface; and the three-dimension model document is further controlled by the three-dimension engine library to load the interface elements.

Preferably, the three-dimension engine library is further used to feed back three-dimension interface status information to the ANDROID system service layer;

the ANDROID system service layer is further used to feed back the three-dimension interface status information to the JAVA terminal; and the JAVA terminal is further used to generate a JAVA interface response window according to the three-dimension interface status information and draw the JAVA interface response window in front of the three-dimension interface.

Preferably, the JAVA terminal is further used to receive a displaying instruction from the ANDROID system, generate the JAVA interface response window according to the displaying instruction, and draw the JAVA interface response window in front of the three-dimension interface.

The present disclosure further yet provides another method based on an ANDROID system for displaying a three-dimension interface, including:

a three-dimension engine library transmitting an user operation command to an ANDROID system services layer;

the ANDROID system service layer searching a JAVA terminal corresponding to the user operation command in multiple JAVA terminals according to the user operation command;

the ANDROID system service layer transmitting the user operation command to the corresponding JAVA terminal;

the corresponding JAVA terminal generating a responding instruction according to the user operation command and sending the responding instruction to the ANDROID system service layer;

the ANDROID system service layer sending the responding instruction to the three-dimension engine library; and the three-dimension engine library controlling a three-dimension model document to load a three-dimension model corresponding to the responding instruction and rebuilding the three-dimension interface accordingly.

Preferably, the method based on an ANDROID system for displaying a three-dimension interface further includes following steps before the step of a three-dimension engine library transmitting a user operation command to an ANDROID system services layer:

the JAVA terminal transmitting a three-dimension modeling instruction to the ANDROID system service layer;

the ANDROID system service layer transmitting the three-dimension modeling instruction to the three-dimension engine library; and the three-dimension engine library controlling the three-dimension model document to load the three-dimension model corresponding to the three-dimension modeling instruction and building the three-dimension interface.

Preferably, the method based on an ANDROID system for displaying a three-dimension interface further includes following steps after the step of the three-dimension engine library controlling the three-dimension model document to load the three-dimension model corresponding to the three-dimension modeling instruction and building the three-dimension interface:

the JAVA terminal reading interface elements stored in the a database of the ANDROID system;

the JAVA terminal transmitting the interface elements to the ANDROID system service layer;

the ANDROID system service layer transmitting the interface elements to the three-dimension engine library; and the three-dimension engine library controlling the three-dimension model document to load the interface elements and drawing the interface elements on the three-dimension interface.

Preferably, the method further based on an ANDROID system for displaying a three-dimension interface includes:

the three-dimension engine library feeding back three-dimension interface status information to the ANDROID system service layer;

the ANDROID system service layer feeding back the three-dimension status information to the JAVA terminal; and the JAVA terminal generating a JAVA interface response window according to the three-dimension interface status information and drawing the JAVA interface response window in front of the three-dimension interface.

Preferably, the method based on an ANDROID system for displaying a three-dimension interface further includes:

the JAVA terminal receiving a displaying instruction transmitted from the ANDROID system; and the JAVA terminal generating the JAVA interface response window according to the displaying instruction and drawing the JAVA interface response window in front of the three-dimension interface.

In the present disclosure, the ANDROID system service layer is used to transmit and arrange the three-dimension modeling instructions between the JAVA terminals and the three-dimension engine libraries by using few system resources, which avoids a decline of processing ability when the system resources are overloaded in an instant, effectively improves responding sensitivity to the user operation, allows for convenient transplanting and changing of the system, and further allows for convenient extending of the function of the system.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
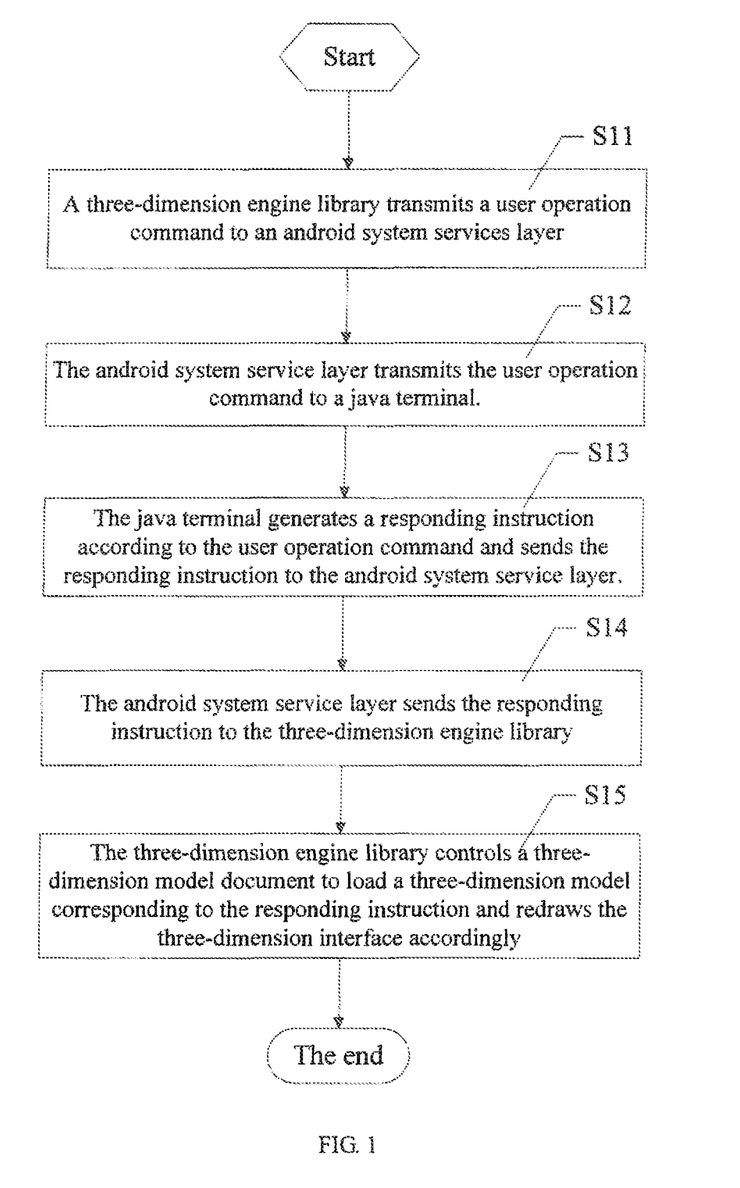
FIG. 1 is a flowchart of a method based on an ANDROID system for displaying a three-dimension interface in accordance with a first embodiment of the present disclosure.

Referring to FIG. 1, which is a flowchart of a method based on an ANDROID system for displaying a three-dimension interface in accordance with a first embodiment of the present disclosure. The method for displaying a three-dimension interface in the first embodiment includes the following steps.

Step S11, a three-dimension engine library transmits a user operation command to an ANDROID system services layer.

Step S12, the ANDROID system service layer transmits the user operation command to a JAVA terminal.

In this embodiment, the ANDROID system is an operation system of a television. An application program document of the ANDROID system allows for the implementation of a JAVA program. The JAVA program is stored in a JAVA virtual machine and is capable of receiving the user operation command from the ANDROID system service layer via the JAVA terminal (a port of the JAVA virtual machine). Since the JAVA program is executed when being called by the ANDROID system and the service layer is a resident process of the ANDROID system, therefore, the service layer can continuously monitor the three-dimension engine library to receive data from the three-dimension engine library after the ANDROID system is started. Therefore, the service layer can be used as a data transmitting bridge between the JAVA terminal and the three-dimension engine library in order to prevent the JAVA terminal from missing the data transmitted from the three-dimension engine library when the JAVA terminal is not running, which allows the service layer to continuously monitor the three-dimension engine library. At the same time, because the ANDROID system service layer requires few system resources in the whole operation process of the ANDROID system, when the ANDROID system calls a number of JAVA programs, each of the JAVA programs is in charge of the corresponding operation control, that is, each JAVA program corresponds to the specific user operation command. After receiving the user operation commands, the ANDROID system service layer filters and arranges the user operation commands, that is, transmits each user operation command to the corresponding JAVA terminal. Thus, each JAVA program is reasonably arranged to avoid a decline of processing ability when the system resources are overloaded in an instant and further to guarantee a sensitive response to the operation of the user.

Step S13, the JAVA terminal generates a responding instruction according to the user operation command and sends the responding instruction to the ANDROID system service layer.

Step S14, the ANDROID system service layer sends the responding instruction to the three-dimension engine library.

When the JAVA terminal feeds back the responding instruction, the ANDROID system service layer monitors the JAVA terminal in real time to receive the responding instruction fed back by the JAVA terminal, which allows the service layer to continuously monitor the JAVA terminal. When the television stores a number of three-dimension engine libraries, each three-dimension engine library is in charge of the corresponding three-dimension modeling operation. The responding instructions sent back from the JAVA terminal are filtered and arranged by the ANDROID system service layer, and each responding instruction is transmitted to the corresponding three-dimension engine library. Thus, each three-dimension engine library is reasonably arranged to avoid a decline of processing ability when the system resources are overloaded in an instant and further to guarantee a sensitive response to the user operation.

Step S15, the three-dimension engine library controls a three-dimension model document to load a three-dimension model corresponding to the responding instruction and redraws the three-dimension interface accordingly.

The three-dimension engine library and the three-dimension model document are used to build and process the three-dimension user interface which can be built by Blender tools.

In this embodiment, the ANDROID system service layer is used to transmit and arrange the instructions/commands between the three-dimension engine library and the JAVA terminal, which can improve the responding sensitivity of the system to the user operation. Meanwhile, because the ANDROID system service layer has a port registry function, an instruction arranging function, and an user interface foreground and background managing function, and the three-dimension model document and the three-dimension engine library are independent from the hardware, the user can transplant the system by changing the service terminal without operating the hardware by the three-dimension model document, which is convenient. When the function of the ANDROID system needs to be extended, a corresponding JAVA terminal and an interface corresponding to the added JAVA terminal can be added in the ANDROID system. The ANDROID system service layer transmits the user operation command to the corresponding JAVA terminal to be processed when the user operation command is transmitted, which guarantees the convenient extending of the function. Similarly, the television can store a number of three-dimension engine libraries, and the three-dimension engine libraries and the JAVA terminals can be combined in any combination according to requirements. For example, one three-dimension engine library corresponds to one JAVA terminal, a number of three-dimension engine libraries correspond to one JAVA terminal, or one three-dimension engine library corresponds to a number of JAVA terminals, which is flexible and easy for the extending of the function.

Figure 2:
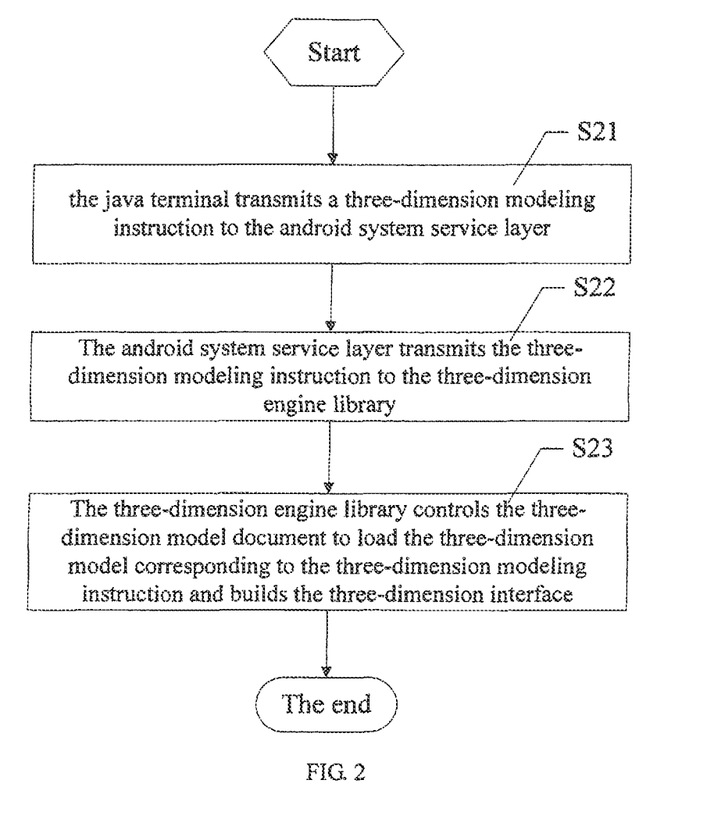
FIG. 2 is a flowchart of a method based on an ANDROID system for displaying a three-dimension interface in accordance with a second embodiment of the present disclosure.

Referring to FIG. 2, FIG. 2 is a flowchart of a method based on an ANDROID system for displaying a three-dimension interface in accordance with a second embodiment of the present disclosure. Based on the method of the first embodiment, the method of the second embodiment further includes following steps before the step S11 of the first method of the first embodiment.

Step S21, the JAVA terminal transmits a three-dimension modeling instruction to the ANDROID system service layer.

In this embodiment, the JAVA terminal of the ANDROID system transmits the three-dimension modeling instruction to inform the three-dimension engine library of starting modeling when the ANDROID system of television is started.

Step S22, the ANDROID system service layer transmits the three-dimension modeling instruction to the three-dimension engine library.

The ANDROID system service layer is used to transmit and arrange the instructions between the three-dimension and the JAVA terminal and to transmit the modeling instruction to the corresponding three-dimension engine library.

Step S23, the three-dimension engine library controls the three-dimension model document to load the three-dimension model corresponding to the three-dimension modeling instruction and builds the three-dimension interface.

The three-dimension engine library controls the three-dimension model document to make the three-dimension model by the Blender according to the three-dimension modeling instruction, and builds the three-dimension interface by a rendering or the other operations.

In this embodiment, when the three-dimension modeling instructions are transmitted from the JAVA terminals to the three-dimension engine libraries, the ANDROID system service layer is used to transmit and arrange the three-dimension modeling instructions between the JAVA terminals and the three-dimension engine libraries by using few system resources, which avoids a decline of processing ability when the system resources are overloaded in an instant and further guarantees a more sensitive response to the user operation.

Figure 3:
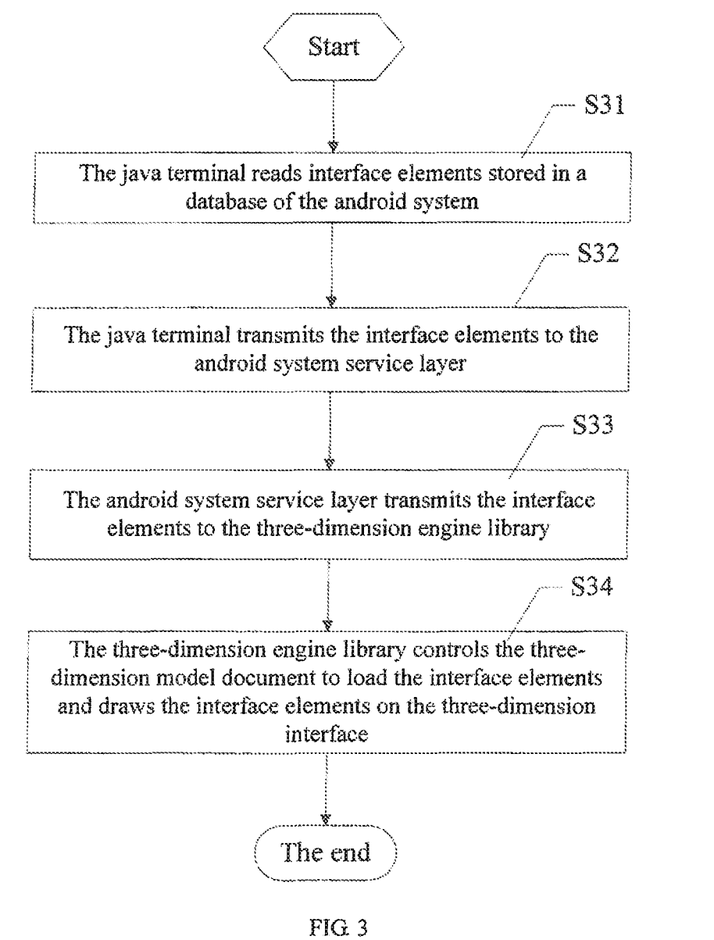
FIG. 3 is a flowchart of a method based on an ANDROID system for displaying a three-dimension interface in accordance with a third embodiment of the present disclosure.

Referring to FIG. 3, FIG. 3 is a flowchart of a method based on an ANDROID system for displaying a three-dimension interface in accordance with a third embodiment of the present disclosure. Based on the method of the second embodiment, the method of the third embodiment further includes following steps after the step S23 of the method of the second embodiment.

Step S31, the JAVA terminal reads interface elements stored in a database of the ANDROID system.

Step S32, the JAVA terminal transmits the interface elements to the ANDROID system service layer.

Step S33, the ANDROID system service layer transmits the interface elements to the three-dimension engine library.

Step S34, the three-dimension engine library controls the three-dimension model document to load the interface elements and draws the interface elements on the three-dimension interface.

In this embodiment, a number of three-dimension interface elements are stored in the database of the ANDROID system. Given the personalized customization into consideration, the mechanism that the database of the ANDROID system stores the interface elements of the three-dimension user interface is introduced for indicating the personalized the three-dimension user interface of the product. On one hand, when the three-dimension engine library and the three-dimension model document are modeling, a large amount of CPU resource is occupied. In order to reduce the occupancy of the CPU by the three-dimension engine library and the three-dimension model document, the interface elements are stored in the database of the ANDROID system and are called by the JAVA terminal when personal settings, such as theme switching, are performed. On the other hand, in order to decrease the amount of the three-dimension modeling data, two-dimension interface elements, such as two-dimension pictures and two-dimension icons, etc, are used to simulate the three-dimension visual effect. The two-dimension elements are stored in the database of the ANDROID system. The three-dimension model documents are only used to store the three-dimension model architectures. The two-dimension data is separated from the three-dimension data when being stored, and is in cooperative with the three-dimension data when the three-dimension interface is modeled. Therefore, the mount of the three-dimension modeling data is effectively decreased, the occupancy of the CPU is reduced, and the response to the system operation is more sensitive.

Figure 4:
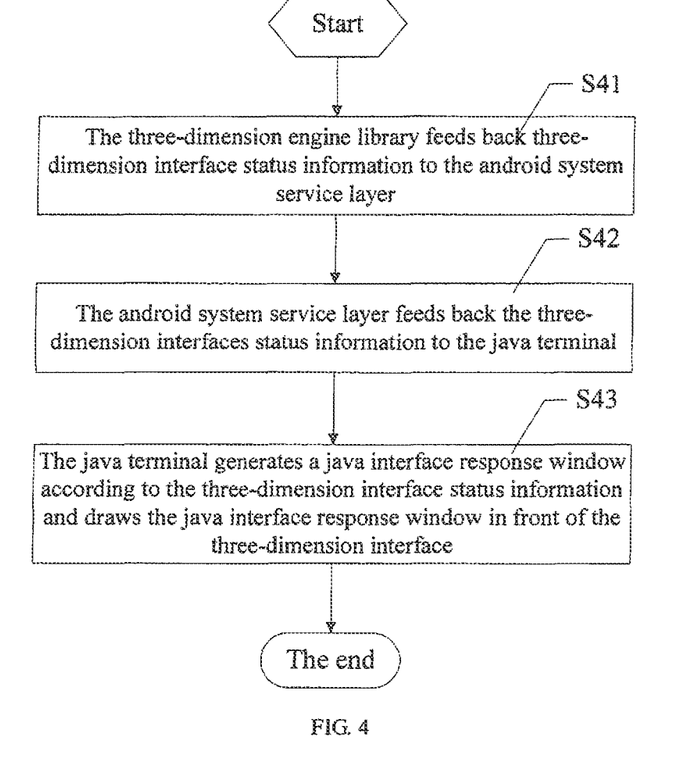
FIG. 4 is a flowchart of a method based on an ANDROID system for displaying a three-dimension interface in accordance with a fourth embodiment of the present disclosure.

Referring to FIG. 4, FIG. 4 is a flowchart of a method based on an ANDROID system for displaying a three-dimension interface in accordance with a fourth embodiment of the present disclosure. Based on the method of the above embodiments, the method of the fourth embodiment further includes the following steps.

Step S41, the three-dimension engine library feeds back three-dimension interface status information to the ANDROID system service layer.

Step S42, the ANDROID system service layer feeds back the three-dimension interfaces status information to the JAVA terminal.

Step S43, the JAVA terminal generates a JAVA interface response window according to the three-dimension interface status information and draws the JAVA interface response window in front of the three-dimension interface.

In this embodiment, the three-dimension engine library monitors the status of the three-dimension interface. When the three-dimension engine library and the three-dimension model document fail to load or model, the three-dimension engine library feeds back the three-dimension interface status information to the JAVA terminal via the ANDROID system service layer, and informs the JAVA terminal that an abnormal situation happens. The JAVA terminal draws a two-dimension JAVA interface response window according to the three-dimension interface status information, for example, to pop up a dialog box of "fails to load" for telling the user that the current building of the three-dimension interface is failed. At this moment, the ANDROID system service layer uses the three-dimension interface as a bottom layer and uses the two-dimension JAVA interface response window as a top layer to solve the problem that the user interfaces are overlapped. Additionally, the ANDROID system service layer is independent in this embodiment. Since the ANDROID system service layer is resident in the memory of the ANDROID system and is always active in the ANDROID system, thus, the ANDROID system service layer can rapidly process the operation and the command. In this way, the problem that when the two-dimension JAVA interface response window and the three-dimension interface are in the same level, the JAVA terminal cannot operate the three-dimension models which are in dormant states is solved.

Figure 5:
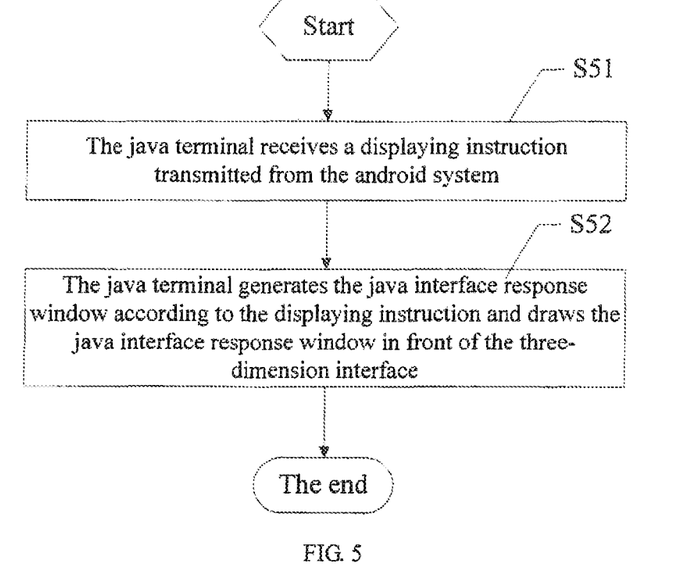
FIG. 5 is a flowchart of a method based on an ANDROID system for displaying a three-dimension interface in accordance with a fifth embodiment of the present disclosure.

Referring to FIG. 5, FIG. 5 is a flowchart of a method based on an ANDROID system for displaying a three-dimension interface in accordance with a fourth embodiment of the present disclosure. Based on the method of the above embodiments, the method of the fifth embodiment further includes the following steps.

Step S51, the JAVA terminal receives a displaying instruction transmitted from the ANDROID system.

Step S52, the JAVA terminal generates the JAVA interface response window according to the displaying instruction and draws the JAVA interface response window in front of the three-dimension interface.

In this embodiment, the JAVA terminal further draws the JAVA interface response window according to the displaying instruction sent from the ANDROID system. For example, when the USB disk is unplugged, the ANDROID system pops up a reminding box. At this moment, the ANDROID system service layer uses the three-dimension interface as a bottom layer and uses the two-dimension JAVA interface response window as a top layer to solve the problem that the user interfaces are overlapped. Additionally, the ANDROID system service layer is independent in this embodiment. Since the ANDROID system service layer is resident in the memory of the ANDROID system and is always active in the ANDROID system, thus, the ANDROID system service layer can rapidly process the operation and the command. In this way, the problem that the JAVA terminal cannot operate the three-dimension models which are in dormant states when the two-dimension JAVA interface response window and the three-dimension interface are in the same level is solved.

Figure 6:
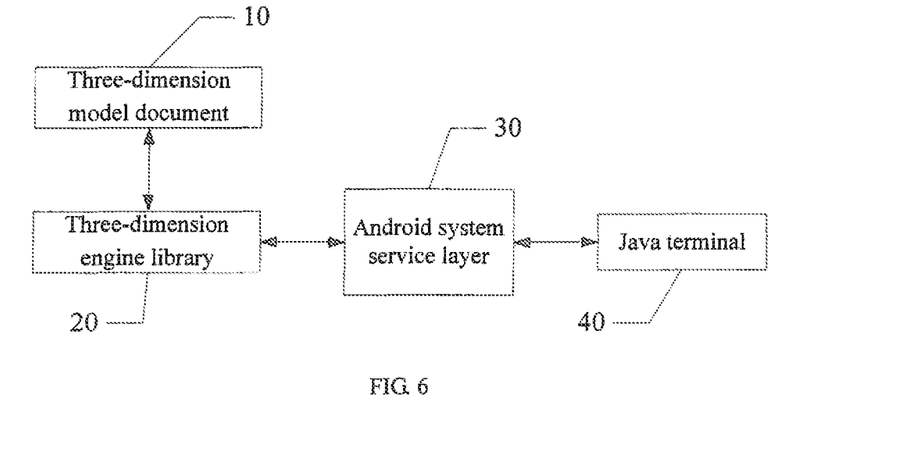
FIG. 6 is a block diagram of a system based on an ANDROID system for displaying a three-dimension interface in accordance with a first embodiment of the present disclosure.

Referring to FIG. 6, FIG. 6 is a block diagram of a system based on an ANDROID system for displaying a three-dimension interface in accordance with a first embodiment. The system based on the ANDROID system for displaying the three-dimension interface includes a three-dimension model document 10, a three-dimension engine library 20, an ANDROID system service layer 30, and a JAVA terminal 40.

The three-dimension engine library 20 transmits a user operation command to the ANDROID system service layer 30, controls the three-dimension model document 10 to load a three-dimension model corresponding to a responding instruction, and redraws the three-dimension interface.

The three-dimension model document 10 is controlled by the three-dimension engine library 20 to load the three-dimension model corresponding to the responding instruction.

The ANDROID system service layer 30 transmits the user operation command to the JAVA terminal 40 and transmits the responding instruction to the three-dimension engine library 20.

The JAVA terminal 40 generates the responding instruction according to the user operation command and transmits the responding instruction to the ANDROID system service layer 30.

In this embodiment, the ANDROID system is an operation system of the television. An application program document of the ANDROID system allows for the implementation of a JAVA program. The JAVA program is stored in a JAVA virtual machine, and is capable of receiving the user command from the ANDROID system service layer 30 via the JAVA terminal 40 (a port of the JAVA virtual machine). Because the JAVA program is run after being called by the ANDROID system and the service layer 30 is a resident process of the ANDROID system, the service layer can continuously monitor the three-dimension engine library 20 to receive the data of the three-dimension engine library 20 after the ANDROID system is started. Thus, the service layer 30 can be used as an information transmitting bridge between the JAVA terminal 40 and the three-dimension engine library 20, which can prevent the JAVA terminal 40 from missing the data transmitted from the three-dimension engine library 20 if the JAVA terminal 40 is not running and allow the service layer 30 to continuously monitor the three-dimension engine library 20. Additionally, because the ANDROID system service layer 30 requires few system resources in the whole operation of the ANDROID system, when multiple JAVA programs are running in the ANDROID system, each JAVA program is in charge of the corresponding operation control, that is, each JAVA terminal 40 corresponds to the corresponding user operation command. The ANDROID system service layer 30 filters and arranges the user operation commands after receiving the user operation commands, that is, the ANDROID system service layer 30 transmits each user operation command to the corresponding JAVA terminal 40. Each JAVA program is reasonably arranged to avoid a decline of processing ability when the system resources are overloaded in an instant and further to guarantee a sensitive response to the user operation. When the JAVA terminal 40 feeds back the responding instruction, the ANDROID system service layer 30 is further used to monitor the JAVA terminal 40 in real time and receive the responding instruction fed back from the JAVA terminal 40, which allows the service layer 30 to continuously monitor the JAVA terminal 40. When there are a number of three-dimension engine libraries 20 in the television, each three-dimension library 20 is in charge of the corresponding three-dimension modeling operation. The ANDROID system service layer 30 filters and arranges the responding instructions transmitted back from the JAVA terminal 40, and transmits each responding instruction to the corresponding three-dimension engine library 20. Each three-dimension engine library 20 is reasonably arranged to avoid a decline of processing ability when the system resources are overloaded in an instant, and further to guarantee a sensitive response to the user operation. The three-dimension engine library 20 and the three-dimension model document 10 are used to build the three-dimension user interface and process the model, which can be built by the Blender tools. In this embodiment, the ANDROID system service layer 30 is used to transmit and arrange the instructions/commands between the three-dimension engine library 20 and the JAVA terminal 40, thus, the responding sensitivity to the user operation is improved. Meanwhile, because the ANDROID system service layer 30 has a port registry function, an instruction arranging function, and a user interface foreground and background managing function, and the three-dimension model document 10 and the three-dimension engine library 20 is independent from the hardware, the system can be transplanted by changing the service terminal without using the three-dimension model document to operate the hardware, which is convenient. When the function of the ANDROID system needs to be extended, a corresponding JAVA terminal 40 and an interface corresponding to the added JAVA terminal 40 can be added in the ANDROID system. The ANDROID system service layer 30 transmits the user operation command to the corresponding JAVA terminal 40 to be processed when the user operation command is transmitted, which guarantees the convenient extending of the function. Similarly, the television can store a number of three-dimension engine libraries 20, and the three-dimension engine libraries 20 and the JAVA terminals 40 can be combined in any combination according to requirements. For example, one three-dimension engine library 20 corresponds to one JAVA terminal 40, a number of three-dimension engine libraries 20 correspond to one JAVA terminal 40, or one three-dimension engine library 20 corresponds to a number of JAVA terminals 40, which is flexible and easy for further extending of the function.

In this embodiment, the JAVA terminal 40 is further used to transmit the three-dimension modeling instruction to the ANDROID system service layer 30.

The ANDROID system service layer 30 is further used to transmit the three-dimension modeling instruction to the three-dimension engine library 20.

The three-dimension engine library 20 is further used to control the three-dimension model document 10 to load the three-dimension model corresponding to the three-dimension modeling instruction and build the three-dimension interface.

The three-dimension model document 10 is further controlled by the three-dimension engine library 20 and is used to load the three-dimension model corresponding to the three-dimension modeling instruction.

In this embodiment, the JAVA terminal 40 transmits the modeling instruction to control the three-dimension engine library 20 to model after the ANDROID system of the television is started. The three-dimension engine library 30 is used to transmit and arrange the instructions/commands between the three-dimension engine library 20 and the JAVA terminal 40, and transmit the modeling instruction to the corresponding three-dimension engine library 20. The three-dimension engine library 20 controls the three-dimension model document 10 to make the three-dimension models by the Blender according to the three-dimension modeling instruction, and builds the three-dimension interface by a rendering or the other operations. In this embodiment, the ANDROID system service layer 30 is used to transmit and arrange the modeling instruction when the JAVA terminal 40 transmits the three-dimension modeling instruction to the three-dimension engine library 20 by using few system resources, which avoids a decline of processing ability when the system resources are overloaded in an instant and further guarantees a more sensitive response to the user operation.

Figure 7:
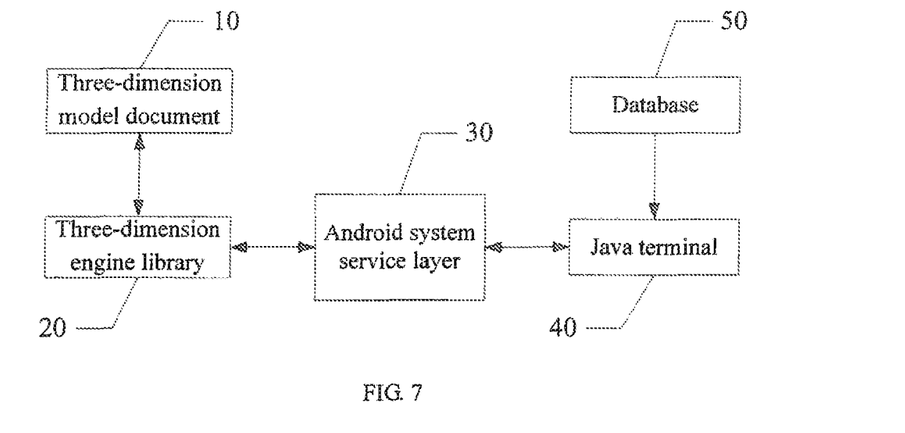
FIG. 7 is a block diagram of a system based on an ANDROID system for displaying a three-dimension interface in accordance with a second embodiment of the present disclosure.

Referring to FIG. 7, FIG. 7 is a block diagram of a system based on an ANDROID system for a displaying a three-dimension interface in accordance with a second embodiment of the present disclosure. In this embodiment, the JAVA terminal 40 is further used to read interface elements stored in a database 50 of the ANDROID system and send the interface elements to the ANDROID system service layer 30.

The ANDROID system service layer 30 is further used to transmit the interface elements to the three-dimension engine library 20.

The three-dimension engine library 20 is further used to control the three-dimension model document 10 to load the interface elements and draw the interface elements on the three-dimension interface.

The three-dimension model document 10 is further controlled by the three-dimension engine library 20 to load the interface elements.

In this embodiment, the interface elements of the three-dimension user interface are stored in the database 50 of the ANDROID system. Given the personalized customization of the three-dimension user interface into consideration, a mechanism that the database 50 of ANDROID system stores the interface elements of the three-dimension user interface is introduced for indicating the personalized three-dimension user interface of the product. On one hand, when the three-dimension engine library 20 and the three-dimension model document 10 are modeling, a large amount of CPU resource is occupied. In order to reduce the occupancy of the CPU made by the three-dimension engine library 20 and the three-dimension model document 10, the interface elements are stored in the database 50 of the ANDROID system and are called by the JAVA terminal 40 when personal settings, such as a theme switching, are performed. On the other hand, in order to decrease the amount of the three-dimension modeling data, two-dimension interface elements, such as two-dimension pictures and two-dimension icons, etc, are used to simulate the three-dimension visual effect. The two-dimension elements are stored in the data base 50 of the ANDROID system and the three-dimension model documents 10 are only used to store the three-dimension model architectures. The two-dimension data and the three-dimension data are separated from each other when being stored, and can cooperate with each other to model the three-dimension interface. Therefore, the amount of the three-dimension modeling data is effectively decreased, the occupancy of the CPU is reduced, and the response to the system operation is more sensitive.

In this embodiment, the three-dimension engine library 20 is further used to feed back the three-dimension interface status information to the ANDROID system service layer 30.

The ANDROID system service layer 30 is further used to feed back the three-dimension interface status information to the JAVA terminal 40.

The JAVA terminal 40 is further used to generate a JAVA interface response window according to the three-dimension interface status information and draw the JAVA interface response window in front of the three-dimension interface.

In this embodiment, the three-dimension engine library 20 monitors the status of the three-dimension interface in real time. When the three-dimension engine library 20 and the three-dimension model document 10 fail to load or model, the three-dimension engine library 20 feeds back the three-dimension interface status information to the JAVA terminal 40 via the ANDROID system service layer 30, and informs the JAVA terminal 40 that an abnormal situation happens. The JAVA terminal 40 draws a two-dimension JAVA interface response window according to the three-dimension interface status information, for example, to pop up a dialog box of "fails to load" for telling the user that the current building of the three-dimension interface is failed. At this moment, the ANDROID system service layer 30 uses the three-dimension interface as a bottom layer and uses the two-dimension JAVA interface response window as a top layer to solve the problem that the user interfaces are overlapped. Additionally, the ANDROID system service layer 30 is independent in this embodiment. Since the ANDROID system service layer is resident in the memory of the ANDROID system and is always active in the ANDROID system, thus, the ANDROID system service layer can rapidly process the operation and the command. In this way, the problem that when the two-dimension JAVA interface response window and the three-dimension interface are in the same level, and the JAVA terminal cannot operate the three-dimension models which are in dormant states is solved.

In this embodiment, the JAVA terminal 40 is further used to receive the displaying instruction, generate the JAVA interface response window according to the displaying instruction, and draw the JAVA interface response window in front of the three-dimension interface.

In this embodiment, the JAVA terminal 40 further draws the JAVA interface response window according to the displaying instruction sent from the ANDROID system. For example, when the USB disk is unplugged, the ANDROID system pops up a reminding box. At this moment, the ANDROID system service layer 30 uses the three-dimension interface as a bottom layer and uses the two-dimension JAVA interface response window as a top layer to solve the problem that the user interfaces are overlapped. Additionally, the ANDROID system service layer 30 is independent in this embodiment. Since the service layer is resident in the memory of the ANDROID system and is always active in the ANDROID system, thus, the service layer can rapidly process the operation and the command. In this way, the problem that the JAVA terminal 40 cannot operate the three-dimension models which are in dormant states when the two-dimension JAVA interface response window and the three-dimension interface are in the same level is solved.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A method based on an ANDROID system for displaying a three-dimension interface, comprising: a three-dimension engine library transmitting a user operation command to an ANDROID system service layer; the ANDROID system service layer transmitting the user operation command to a JAVA terminal; the JAVA terminal generating a responding instruction according to the user operation command and sending the responding instruction to the ANDROID system service layer; the ANDROID system service layer sending the responding instruction to the three-dimension engine library; and the three-dimension engine library controlling a three-dimension model document to load a three-dimension model corresponding to the responding instruction and redrawing the three-dimension interface accordingly;

wherein the ANDROID system service layer is a resident process of the ANDROID system and is configured to continuously monitor the three-dimension engine library and configured to transmit and arrange three-dimension modeling instructions and user operation commands between the three-dimension engine library and the JAVA terminal.

2. The method of claim 1 further comprising following steps before the step of transmitting a user operation command to an ANDROID system services layer: the JAVA terminal transmitting a three-dimension modeling instruction to the ANDROID system service layer; the ANDROID system service layer transmitting the three-dimension modeling instruction to the three-dimension engine library; and the three-dimension engine library controlling the three-dimension model document to load the three-dimension model corresponding to the three-dimension modeling instruction and building the three-dimension interface.

3. The method of claim 2 further comprising following steps after the step of the three-dimension engine library controlling the three-dimension model document to load the three-dimension models corresponding to the three-dimension modeling instructions and building the three-dimension interface: the JAVA terminal reading interface elements stored in a database of the ANDROID system; the JAVA terminal transmitting the interface elements to the ANDROID system service layer; the ANDROID system service layer transmitting the interface elements to the three-dimension engine library; and the three-dimension engine library controlling the three-dimension model document to load the interface elements, and drawing the interface elements on the three-dimension interface.

4. The method of claim 3 further comprising: the three-dimension engine library feeding back three-dimension interface status information to the ANDROID system service layer; the ANDROID system service layer feeding back the three-dimension status information to the JAVA terminal; and the JAVA terminal generating a JAVA interface response window according to the three-dimension interface status information and drawing the JAVA interface response window in front of the three-dimension interface.

5. The method of claim 3 further comprising: the JAVA terminal receiving a displaying instruction transmitted from the ANDROID system; and the JAVA terminal generating the JAVA interface response window according to the displaying instruction and drawing the JAVA interface response window in front of the three-dimension interface.

6. The method of claim 1, wherein two-dimension interface elements are used to simulate three-dimension visual effect and the two-dimension interface elements are stored in a database of the ANDROID system; and the two-dimension interface elements are in cooperative with three-dimension model architectures when a three-dimension interface is modeled and the three-dimension model architectures are stored in three-dimension model documents.

7. The method of claim 6, wherein the ANDROID system service layer uses the three-dimension interface as a bottom layer and uses a two-dimension JAVA interface response window as a top layer.

8. A system based on an ANDROID system for displaying a three-dimension interface, wherein the system comprises a three-dimension model document, a three-dimension engine library, an ANDROID system service layer, and a JAVA terminal; the three-dimension engine library is configured for transmitting an user operation command to the ANDROID system service layer, controlling the three-dimension model document to load a three-dimension model corresponding to a responding instruction, and redrawing the three-dimension interface; the three-dimension model document is configured for loading the three-dimension model corresponding to the responding instruction when being controlled by the three-dimension engine library; and the ANDROID system service layer is configured for transmitting the user operation command to the JAVA terminal and transmitting the responding instruction to the three-dimension engine library; and the JAVA terminal is configured for generating the responding instruction according to the user operation command and transmitting the responding instruction to the ANDROID system service layer;

wherein the ANDROID system service layer is a resident process of the ANDROID system and is configured to continuously monitor the three-dimension engine library and configured to transmit and arrange three-dimension modeling instructions and user operation commands between the three-dimension engine library and the JAVA terminal.

9. The system of claim 8, wherein two-dimension interface elements are used to simulate three-dimension visual effect and the two-dimension interface elements are stored in a database of the ANDROID system; and the two-dimension interface elements are in cooperative with three-dimension model architectures when a three-dimension interface is modeled and the three-dimension model architectures are stored in three-dimension model documents.

10. The system of claim 9, wherein the ANDROID system service layer uses the three-dimension interface as a bottom layer and uses a two-dimension JAVA interface response window as a top layer.

11. The system of claim 8, wherein the JAVA terminal is further used to transmit a three-dimension modeling instruction to the ANDROID system service layer; the ANDROID system service layer is further used to transmit the three-dimension modeling instruction to the three-dimension engine library; the three-dimension engine library is further used to control the three-dimension model document to load the three-dimension model corresponding to the three-dimension modeling instruction and build the three-dimension interface; and the three-dimension model document is further controlled by the three-dimension engine library to load the three-dimension model corresponding to the three-dimension modeling instruction.

12. The system of claim 11, wherein the JAVA terminal is further used to read interface elements stored in the ANDROID system data base and send the interface elements to the ANDROID system service layer; the ANDROID system service layer is further used to transmit the interface elements to the three-dimension engine library; the three-dimension engine library is further used to control the three-dimension model document to load the interface elements and draw the interface elements on the three-dimension interface; and the three-dimension model document is further controlled by the three-dimension engine library to load the interface elements.

13. The system of claim 12, wherein the three-dimension engine library is further used to feed back three-dimension interface status information to the ANDROID system service layer; the ANDROID system service layer is further used to feed back the three-dimension interface status information to the JAVA terminal; and the JAVA terminal is further used to generate a JAVA interface response window according to the three-dimension interface status information and draw the JAVA interface response window in front of the three-dimension interface.

14. The system of claim 12, wherein the JAVA terminal is further used to receive a displaying instruction from the ANDROID system, generate the JAVA interface response window according to the displaying instruction, and draw the JAVA interface response window in front of the three-dimension interface.

15. A method based on an ANDROID system for displaying a three-dimension interface, comprising: a three-dimension engine library transmitting an user operation command to an ANDROID system services layer; the ANDROID system service layer searching a JAVA terminal corresponding to the user operation command in multiple JAVA terminals according to the user operation command; the ANDROID system service layer transmitting the user operation command to the corresponding JAVA terminal; the corresponding JAVA terminal generating a responding instruction according to the user operation command and sending the responding instruction to the ANDROID system service layer; the ANDROID system service layer sending the responding instruction to the three-dimension engine library; and the three-dimension engine library controlling a three-dimension model document to load a three-dimension model corresponding to the responding instruction and rebuilding the three-dimension interface accordingly;

wherein the ANDROID system service layer is a resident process of the ANDROID system and is configured to continuously monitor the three-dimension engine library and configured to transmit and arrange three-dimension modeling instructions and user operation commands between the three-dimension engine library and the JAVA terminal.

16. The method of claim 15, wherein two-dimension interface elements are used to simulate three-dimension visual effect and the two-dimension interface elements are stored in a database of the ANDROID system; and the two-dimension interface elements are in cooperative with three-dimension model architectures when a three-dimension interface is modeled and the three-dimension model architectures are stored in three-dimension model documents.

17. The method of claim 15 further comprising following steps before the step of a three-dimension engine library transmitting a user operation command to an ANDROID system services layer: the JAVA terminal transmitting a three-dimension modeling instruction to the ANDROID system service layer; the ANDROID system service layer transmitting the three-dimension modeling instruction to the three-dimension engine library; and the three-dimension engine library controlling the three-dimension model document to load the three-dimension model corresponding to the three-dimension modeling instruction and building the three-dimension interface.

18. The method of claim 17 further comprising following steps after the step of the three-dimension engine library controlling the three-dimension model document to load the three-dimension model corresponding to the three-dimension modeling instruction and building the three-dimension interface: the JAVA terminal reading interface elements stored in the a database of the ANDROID system; the JAVA terminal transmitting the interface elements to the ANDROID system service layer; the ANDROID system service layer transmitting the interface elements to the three-dimension engine library; and the three-dimension engine library controlling the three-dimension model document to load the interface elements and drawing the interface elements on the three-dimension interface.

19. The method of claim 18 further comprising: the three-dimension engine library feeding back three-dimension interface status information to the ANDROID system service layer; the ANDROID system service layer feeding back the three-dimension status information to the JAVA terminal; and the JAVA terminal generating a JAVA interface response window according to the three-dimension interface status information and drawing the JAVA interface response window in front of the three-dimension interface.

20. The method of claim 18 further comprising: the JAVA terminal receiving a displaying instruction transmitted from the ANDROID system; and the JAVA terminal generating the JAVA interface response window according to the displaying instruction and drawing the JAVA interface response window in front of the three-dimension interface.

* * * * *